J. L. VAN VALKENBURGH.
Grain Winnower.
No. 10,114.
Patented Oct. 11, 1853.
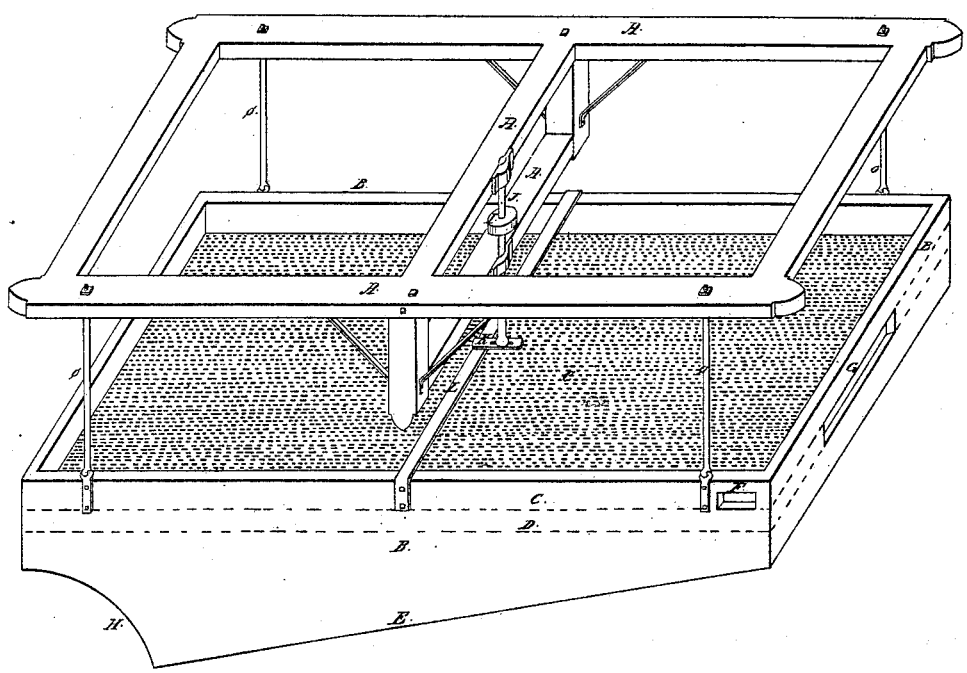
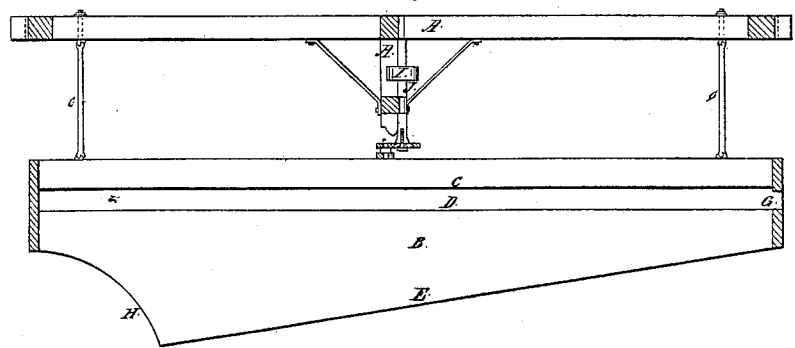

UNITED STATES PATENT OFFICE.

JACOB L. VAN VALKENBURGH, OF OGDENSBURGH, NEW YORK.

SHAKING-SHOE FOR WINNOWERS.

Specification of Letters Patent No. 10,114, dated October 11, 1853.

*To all whom it may concern:*

Be it known that I, JACOB L. VAN VALKENBURGH, of Ogdensburgh, in the county of St. Lawrence and State of New York, have invented a new and useful Machine called "Van Valkenburgh's Rotary Grain-Separator," of which the following is a full and accurate description, reference being had to the accompanying drawings.

The object of the machine is to separate cockle, dirt, oats and other extraneous substances from wheat and other grain.

A is the frame which may be supported by rods from the ceiling, or in any other convenient manner.

B is the receiver which is supported by rods O, from the frame. The rods O have each two joints so as to permit the receiver to move freely with a rotating motion as hereinafter described. The rods O are secured by nuts at the top by which they can be raised so as to give the proper slant to the surface of the sieves. C is a coarse sieve, which I make of sheet iron with holes punched in it of such size as to permit the wheat, or whatever grain is to be cleaned, to pass through freely. (It may also be made of wire or other substances of which sieves are made, but I prefer sheet iron.) D is a similar sieve but finer, so as to retain the wheat or other grain to be cleaned, while the cockle, fine dirt and other impurities, pass through into the bottom of the receiver.

E is the bottom of the receiver which I make of sheet iron.

F is an opening, level with the top of the sieve C, through which the coarse dirt, &c., passes off.

G is an opening between the sieves C and D, through which the grain when cleaned passes out; and H is an opening for the passage of the fine dirt, cockle &c.

I is a driving pulley on the shaft J, to which motion is communicated by means of a belt.

K is a crank with a slot through which the shaft J passes, and to which it is fastened by a nut at the bottom of the shaft.

L is an iron bar firmly attached to the two sides of the receiver and having a hole drilled in its center in which works a pivot from the crank K.

The grain to be cleaned being allowed to run into the receiver, the shaft is made to revolve and the crank K communicates a reciprocating rotating motion to the receiver, by which the grain with the cockle and other fine impurities, are made to pass through the sieve C; leaving the coarser substances on the surface and passing out through the aperture F. The same motion causes the cockle and all dirt and substances finer than the grain to pass through the sieve D, and out at H; while the clean grain comes out at the aperture G.

The principal advantages of this machine over any other are 1st that the peculiar motion given, while it is as effectual as any other in agitating the grain, still allows joints of straw, oats, rat dirt and other like, to lay flat, and thereby prevents their passing through the sieve C; whereas in other machines the motion is such as to turn them up on their ends and allow them to pass through the sieve with the grain. 2d It can be constructed at much less expense, and is far more durable than any other machine used for the same purpose. And 3d, it requires much less power to drive it.

What I claim as my invention and desire to secure by Letters Patent, is—

Not the use of sieves in cleaning grain, but the communication of a reciprocating rotating motion to the sieves or separators, and also the construction of the machine in the manner substantially as above set forth for separating grain from cockle and other impurities.

Given under my hand at Ogdensburgh this twenty fourth day of August, A. D. 1853.

J. L. VAN VALKENBURGH.

Witnesses:
P. DELANY, Jr.,
WM. C. BROWN.